(12) United States Patent
Monkowski et al.

(10) Patent No.: US 8,393,197 B2
(45) Date of Patent: Mar. 12, 2013

(54) METHOD AND APPARATUS FOR THE MEASUREMENT OF ATMOSPHERIC LEAKS IN THE PRESENCE OF CHAMBER OUTGASSING

(75) Inventors: Joseph R. Monkowski, Danville, CA (US); Barton Lane, Pleasanton, CA (US)

(73) Assignee: Pivotal Systems Corporation, Pleasanton, CA (US)

( * ) Notice: Subject to any disclaimer, the term of this patent is extended or adjusted under 35 U.S.C. 154(b) by 685 days.

(21) Appl. No.: 12/509,375

(22) Filed: Jul. 24, 2009

(65) Prior Publication Data

US 2010/0018293 A1    Jan. 28, 2010

Related U.S. Application Data

(60) Provisional application No. 61/083,489, filed on Jul. 24, 2008.

(51) Int. Cl.
*G01M 3/38* (2006.01)
*G01M 3/40* (2006.01)

(52) U.S. Cl. .................. 73/49.2; 73/40.5 R; 73/40.7
(58) Field of Classification Search .............. 73/40–49.8
See application file for complete search history.

(56) References Cited

U.S. PATENT DOCUMENTS

| | | | | |
|---|---|---|---|---|
| 4,857,136 A * | 8/1989 | Zajac | ............................. | 438/16 |
| 5,210,413 A * | 5/1993 | Balzer | ............................. | 250/298 |
| 5,369,983 A * | 12/1994 | Grenfell | ............................. | 73/40.7 |
| 5,522,957 A * | 6/1996 | Weling et al. | ............... | 438/694 |
| 5,789,754 A * | 8/1998 | Cathey et al. | ................ | 250/372 |
| 6,077,386 A * | 6/2000 | Smith et al. | ............... | 156/345.24 |
| 6,769,288 B2 * | 8/2004 | Ward et al. | .................. | 73/40.7 |
| 6,813,534 B2 * | 11/2004 | Sui et al. | ...................... | 700/121 |
| 7,072,028 B2 * | 7/2006 | Powell et al. | .................. | 356/72 |
| 7,590,498 B1 * | 9/2009 | Chung et al. | ................... | 702/51 |
| 7,752,892 B2 * | 7/2010 | Muller et al. | .................. | 73/49.2 |
| 7,879,409 B2 * | 2/2011 | Furuta et al. | ................. | 427/489 |
| 2003/0046976 A1 * | 3/2003 | Hanazaki et al. | ........... | 73/23.21 |
| 2004/0164298 A1 * | 8/2004 | Hiramatsu et al. | .............. | 257/66 |
| 2005/0037500 A1 * | 2/2005 | Ciovacco et al. | ................ | 436/3 |
| 2005/0220984 A1 * | 10/2005 | Sun et al. | ......................... | 427/8 |
| 2006/0051520 A1 * | 3/2006 | Behle et al. | ................... | 427/569 |
| 2007/0215043 A1 * | 9/2007 | Yamazawa et al. | ........... | 118/665 |
| 2007/0221620 A1 * | 9/2007 | Sakthivel et al. | .............. | 216/59 |
| 2007/0229845 A1 * | 10/2007 | Usui et al. | ..................... | 356/503 |
| 2007/0275485 A1 * | 11/2007 | Gibson, Jr. | ........................ | 438/8 |
| 2007/0281478 A1 * | 12/2007 | Ikegami et al. | .............. | 438/689 |
| 2008/0020495 A1 * | 1/2008 | Usui et al. | .......................... | 438/9 |
| 2008/0041716 A1 * | 2/2008 | Alpay et al. | ................. | 204/192.2 |
| 2008/0110233 A1 * | 5/2008 | Tanaka et al. | .................. | 73/1.06 |
| 2009/0229348 A1 * | 9/2009 | Woo | ........................... | 73/40.5 R |

FOREIGN PATENT DOCUMENTS

| | | | |
|---|---|---|---|
| JP | 09101229 A | * | 4/1997 |
| WO | WO 0223585 A2 | * | 3/2002 |
| WO | WO 2008002075 A1 | * | 1/2008 |

* cited by examiner

*Primary Examiner* — David Rogers

(74) *Attorney, Agent, or Firm* — Nixon Peabody LLP; Joseph Bach, Esq.

(57) ABSTRACT

Embodiments of the present invention employ measurement of argon as the means to detect the presence of an atmospheric leak in a processing chamber. Argon detected inside the process chamber is conclusive evidence of a leak. Furthermore, the amount of detected argon provides information on the rate of air entering through the leak. In one embodiment, leak detection takes place in the main plasma inside the processing chamber. In another embodiment, leak detection takes place in the self-contained plasma generated in a remote plasma sensor. Additional measurements can be performed, such as measuring the amount of oxygen, and/or the presence of moisture to help in detecting and quantifying outgassing from the processing chamber.

20 Claims, 4 Drawing Sheets

METHOD AND APPARATUS FOR THE MEASUREMENT OF ATMOSPHERIC LEAKS IN THE PRESENCE OF CHAMBER OUTGASSING

REFERENCE TO RELATED APPLICATIONS

This application claims priority from U.S. Provisional Application Ser. No. 61/083,489, filed on Jul. 24, 2008, the disclosure of which is incorporated herein by reference.

BACKGROUND

Certain industrial processes depend on maintaining environments free of atmospheric contamination. One example is in the field of semiconductor device manufacturing, which uses a wide variety of environments for processing wafers into integrated circuits (ICs). Many of these processing environments can be significantly degraded with even very small amounts of oxygen, moisture, and/or nitrogen, all of which are present in air. Consequently, even small leaks that allow air into the processing chamber can be very deleterious to the processing of these wafers.

Chemical vapor deposition (CVD) of silicon and silicon nitride layers onto the silicon wafer are particularly important semiconductor processes that depend on maintaining a process environment as free of atmospheric leaks as possible. Typically, these layers are deposited inside of a vacuum chamber, using gases such as silane or dichlorosilane, which react inside the process chamber to form the deposited layers on the silicon wafers.

If the process environment is very pure, high quality layers can be deposited; however, if even small amounts of oxygen or moisture are introduced into the chamber, the reaction will also form silicon oxide. This silicon oxide can be directly incorporated into the deposited layer, where it will alter the properties of the deposited layer, or it can take the form of particles that can fall onto the silicon wafer and ultimately disrupt the operation of the ICs.

There are many potential causes of leaks in these processing chambers, including damaged or poorly seated O-rings, leaking valves, leaking gas delivery systems, etc. Since there are many sources, the occurrence of a leak is extremely difficult to predict; consequently, it is highly desirable to be able to detect the presence of a leak prior to carrying out the specific process step, such as the chemical vapor deposition of a silicon or silicon nitride layer.

One very straightforward approach to detecting the presence of an atmospheric leak is to use a measurement technique that can detect very small amounts of oxygen or moisture inside the process chamber. Typical techniques that one could use include optical emission spectroscopy, infrared absorption, or residual gas analysis. One could also use these techniques to measure nitrogen; however, many processing environments already contain nitrogen as one of the gases used in the process, particularly if the deposited layer contains nitrogen, such as in the case of a silicon nitride layer.

Another approach for detecting the presence of a leak is to pump down the chamber to a low pressure, then completely seal off the chamber from the pump, and measure the rate of rise of pressure. In this case, it is assumed that any pressure rise is attributable to air entering the chamber.

Unfortunately, these measurements can be inaccurate if there is any oxygen or moisture entering the process chamber environment in addition to the atmospheric leak. Particularly in the silicon dioxide or alumina process chambers used for the deposition of silicon and silicon nitride layers, gases such as oxygen and moisture can be adsorbed onto the chamber walls whenever the chamber walls are exposed to these gases. Exposure to these gases can occur during loading and unloading of the wafers. In subsequent steps, when the chamber is pumped down to low processing pressures, any oxygen or moisture that is present on the walls will desorb over time, thus entering the process environment. This process is referred to as "outgassing".

Although outgassing of oxygen or moisture is undesirable, it is not nearly as deleterious as a leak. In the case that oxygen or moisture is adsorbed on the chamber wall, during the first few seconds of the silicon or silicon nitride deposition process the silane or dichlorosilane will quickly react with these gases and form a layer that covers these adsorbed gases. In the case of a leak, however, the oxygen and moisture will continue to be present during the entire deposition process.

Since atmospheric leaks are much more deleterious than outgassing, it would be desirable to be able to differentiate between the two sources of oxygen and moisture contamination. Current techniques, however, cannot differentiate between the two sources of contamination. From the above, it is seen that improved techniques for measuring atmospheric leaks in process chambers are desired.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the present invention employ a measurement of argon as the means to detect the presence of an atmospheric leak in a processing chamber. Argon detected inside the process chamber is conclusive evidence of a leak. Furthermore, the amount of detected argon provides information on the rate of air entering through the leak.

In one embodiment, leak detection takes place in the main plasma inside the processing chamber.

In another embodiment, leak detection takes place in the self-contained plasma generated in a remote plasma sensor.

Additional measurements can be performed, such as measuring the amount of oxygen, and/or the presence of moisture to help in detecting and quantifying outgassing from the processing chamber.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Embodiments of the present invention employ a measurement of argon as the means to detect the presence of an atmospheric leak. Unlike oxygen and moisture, argon has very little propensity to adsorb onto the chamber walls; however, just like oxygen, argon comprises a certain fraction of air. Consequently, if one detects argon inside the process chamber, it is conclusive evidence of a leak. Furthermore, the amount of detected argon provides information on the rate of air entering through the leak.

A separate measurement of oxygen or moisture can then provide information on the amount of outgassing. In this way, one can obtain separate measurements of the leak rate and the outgassing rate. In fact, one could simultaneously measure argon and oxygen, even while also measuring the rate of rise of pressure. Alternatively, the measurement for argon could be made in any process step prior to or during the chemical vapor deposition step.

For beneficial results, one needs to use a measurement technique that is sufficiently sensitive to detect the small amount of argon that will be present from the leak. Many of the techniques that are used for detection of oxygen can also be used for detection of the argon. For example, one can use optical emission spectroscopy, perhaps in conjunction with a remote, self-contained plasma; infrared adsorption; or residual gas analysis. The only criterion is that the sensitivity of the measurement technique be sufficiently high to be able to detect the trace amount of argon present from the leak.

In Optical Emission Spectroscopy (OES), atoms in a sample are excited by applying external energy. For example, a spark may be formed between two electrodes or a sample and an electrode. The energy of the spark causes the electrons in the sample to emit light which is converted into a spectral pattern. By measuring the intensity of the peaks in this spectrum, OES analyzers can provide analysis of the material composition of the sample.

Residual Gas Analysis (RGA) is a conventional technique used for identifying the gases present in a vacuum environment. The equipment generally used in performing RGA is referred to as a residual gas analyzer (also generally referred to by the same acronym, RGA). Example of a RGA is the MicroVision Plus, available from MKS of Andover, Mass.

Though silicon wafer is often mentioned for illustrative purpose, persons skilled in the art will understand that the scope of the invention is not limited by the wafer material. Similarly, the scope of the invention is not limited by the type of gas used for plasma.

Figure 1:
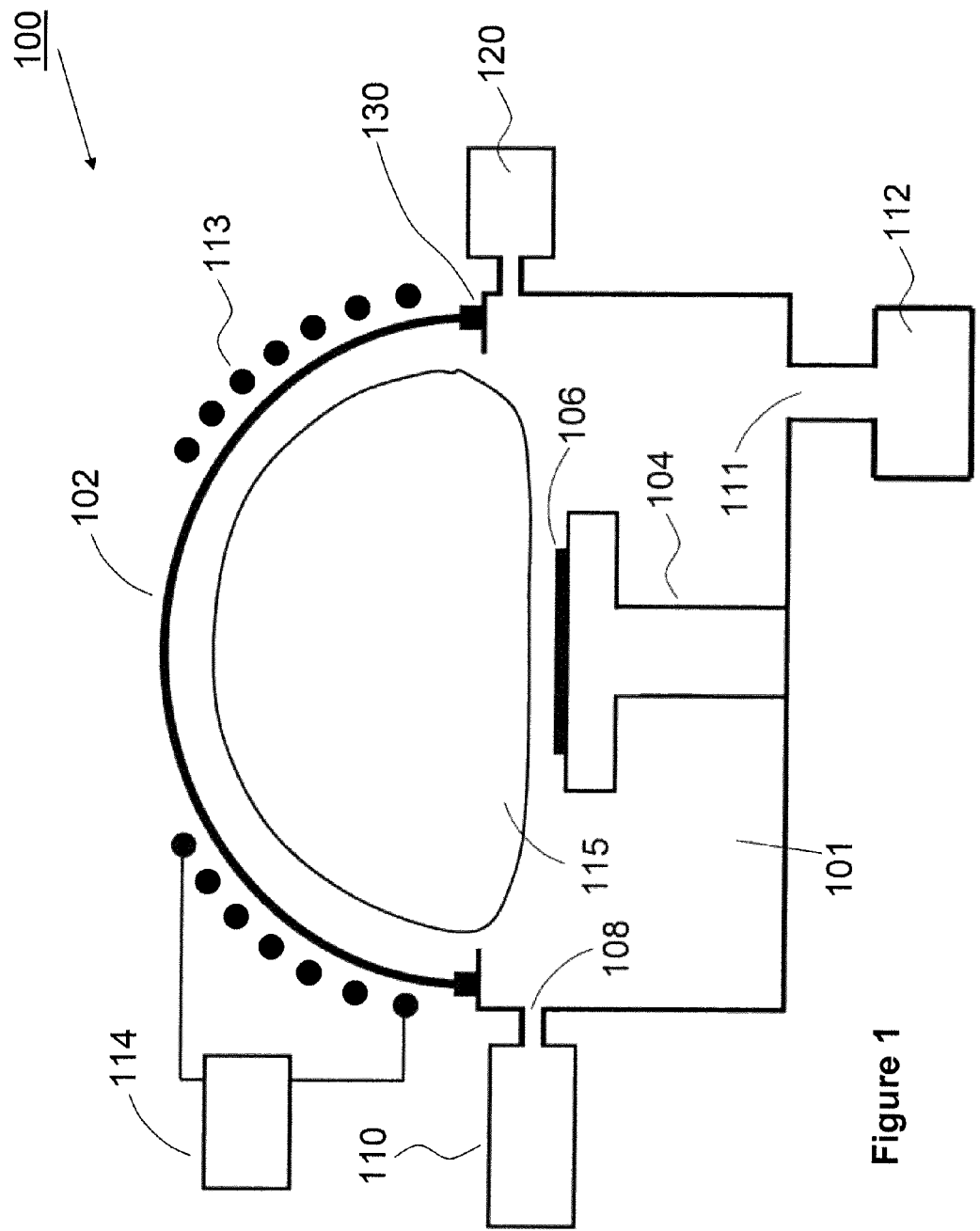
FIG. 1 is a simplified schematic view of a processing system using an embodiment of the present invention, where the leak detection takes place in the main plasma inside the processing chamber.

FIG. 1 is a simplified view of an embodiment of an apparatus in accordance with the present invention for processing wafers. Apparatus 100 includes a processing chamber 101, having a removable top section 102 and a chuck 104 configured to support a wafer 106. Chamber 101 is coupled to an inlet 108 for receiving gas from a gas supply 110, and an outlet 111 coupled with a vacuum pump 112. Chamber 101 is also coupled to a spiral coil 113, which is powered by an RF (radio frequency) power source 114 to generate a plasma 115. A chemical component analysis device (such as, a spectrometer 120, a residual gas analyzer, an infrared absorption meter or the like) is used to detect the gas species in the plasma. For example, if a spectrometer 120 is used as the chemical component analysis device, optical emissions from the plasma are detected, where the wavelengths of these optical emissions are characteristic of the specific gas species in the plasma and the intensity of each of the emissions is a measure of the concentration of that gas species in the plasma.

In a typical operation to deposit a layer, such as silicon nitride, on the wafer 106, the wafer 106 is loaded on the chuck 104, and vacuum pump 112 is activated to evacuate chamber 101. Gas from gas supply 110 is flowed into the chamber 101, and RF power is applied to coil 113 to generate a plasma 115 inside the chamber 101. The plasma 115 causes the gases to react in such a way that they deposit the desired layer on the wafer 106.

The chamber 101 contains various seals that allow the different parts to be attached to the chamber 101 without allowing any air from outside the chamber 101 to penetrate into the chamber 101. One example of such a seal is the O-ring 130 (not specifically visible) that keeps the chamber 101 air-tight, but allows the top section 102 to be removed when necessary, such as for maintenance or repair of components inside the chamber 101. Another example of such a seal is the O-ring that seals the door (not shown) through which the wafer 106 is inserted into the chamber 101.

From time to time, one or more of these seals 130 might not seat properly, or they might degrade from chemical attack, with the end result that they allow air into the chamber 101. If this air leak occurs during the deposition of the layer on the wafer 1 06, unwanted reactions will take place in the plasma 115, and the layer will be damaged or contaminated.

According the embodiment shown in FIG. 1, after the wafer 106 is loaded but before the gases are flowed for the deposition of the desired layer, a gas, such as nitrogen, is flowed into the chamber 101, and the RF power is applied such that a plasma 115 is formed. The plasma 115 will excite not only the nitrogen gas, but also any other gases that are present in the chamber 101. If there is an air leak, the plasma 115 will excite the nitrogen, oxygen, hydrogen (from moisture), and argon that exist in the air. The spectrometer 120 detects the emission from these various gases, and is able to provide a measure of their concentration.

Of the various gases that comprise air, the oxygen and hydrogen cannot be used for detection of an air leak, since oxygen and moisture will enter the chamber 101 any time it is exposed to air, and once they enter, they adsorb onto the chamber 101 walls, and then desorb for an extended period of time even after the air is evacuated from the chamber 101. Nitrogen cannot be used since it is a primary constituent of the gas used in the deposition of layers such as silicon nitride and will often form reaction products during the deposition that deposit on the chamber 101 walls and then later desorb, similar to the oxygen and moisture.

According to the present invention, argon is used as the indicator of an air leak. Argon does not chemically react, and as such does not adsorb on the chamber 101 walls; consequently, if argon is detected inside the chamber 101 once the chamber 101 is evacuated, it is a positive indication that air is being introduced into the chamber 101 via a leak. Since the spectrometer 120 can provide a measure of the concentration of the argon, it can provide a measure of the leak rate of air into the chamber 101.

Figure 2:
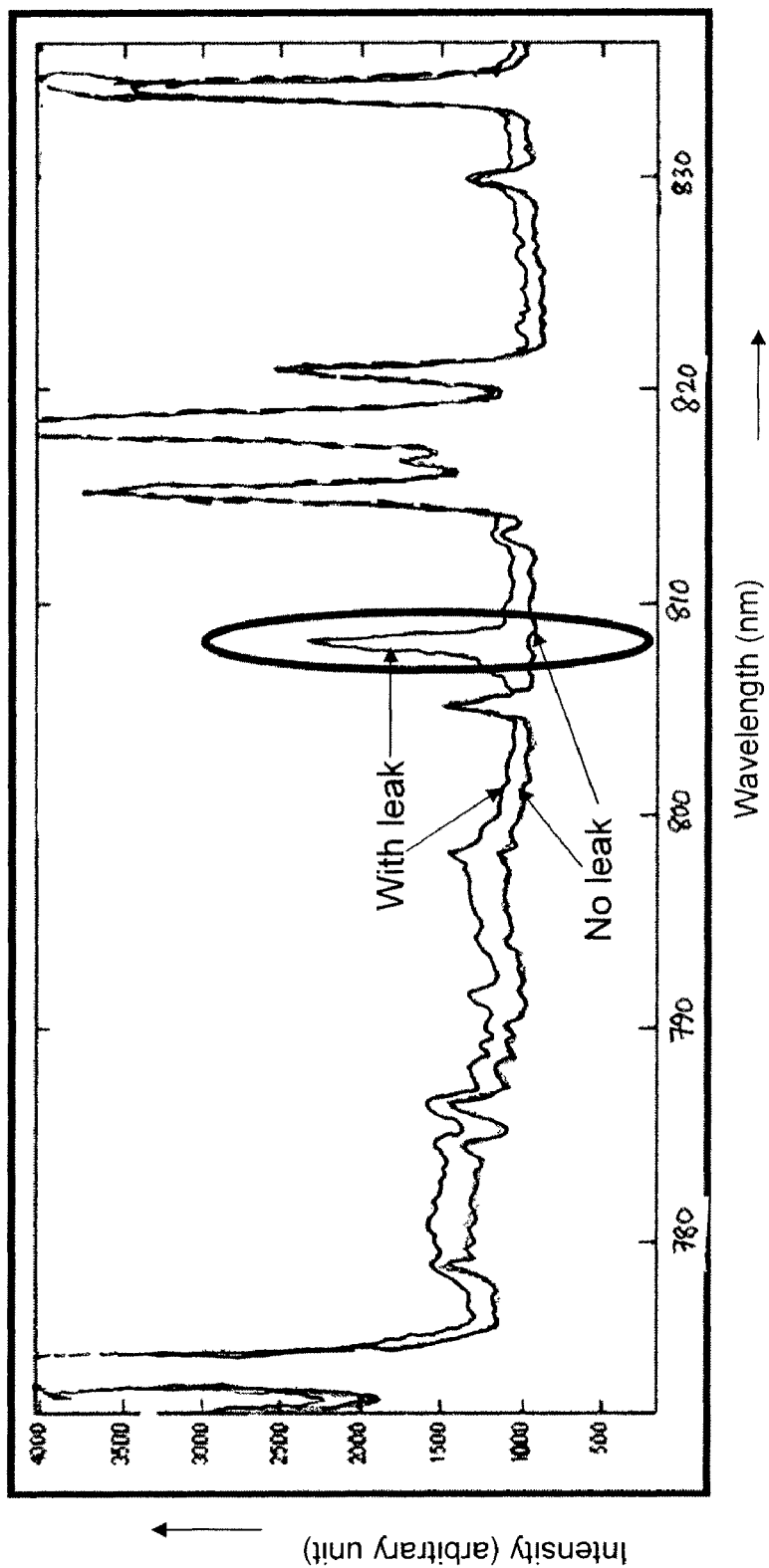
FIG. 2 shows a comparison of a spectrum taken from a processing chamber with no leak and a spectrum taken from a processing chamber with an air leak.

FIG. 2 shows a part of the spectrum that is provided by the spectrometer 120 for a situation where there is no leak (the bottom curve) and a situation where there is a leak (the top curve). In both cases, all of the peaks of the spectra are very similar, since they are a result of the nitrogen in the chamber 101. There is one peak that is very different, however, and that is the highlighted peak (encompassed by the marking oval) at approximately 810 nm, which is a major peak for argon. The presence of this peak indicates the presence of an air leak, and the height of the peak is a measure of the leak rate.

In another embodiment of the present invention, an RGA (residual gas analyzer) is used in place of the spectrometer 120. In this case, instead of measuring the amount of optical emission from the constituents of the gas inside the chamber 101 as a function of wavelength, one would measure a representative amount of ions of each of the constituents as a function of their atomic mass.

In yet another embodiment, infrared absorption is used in place of the spectrometer 120. In this case, the infrared absorption is measured instead of the optical emission; however, the concept is very similar for detecting and measuring the presence of the various gas constituents.

Figure 3:
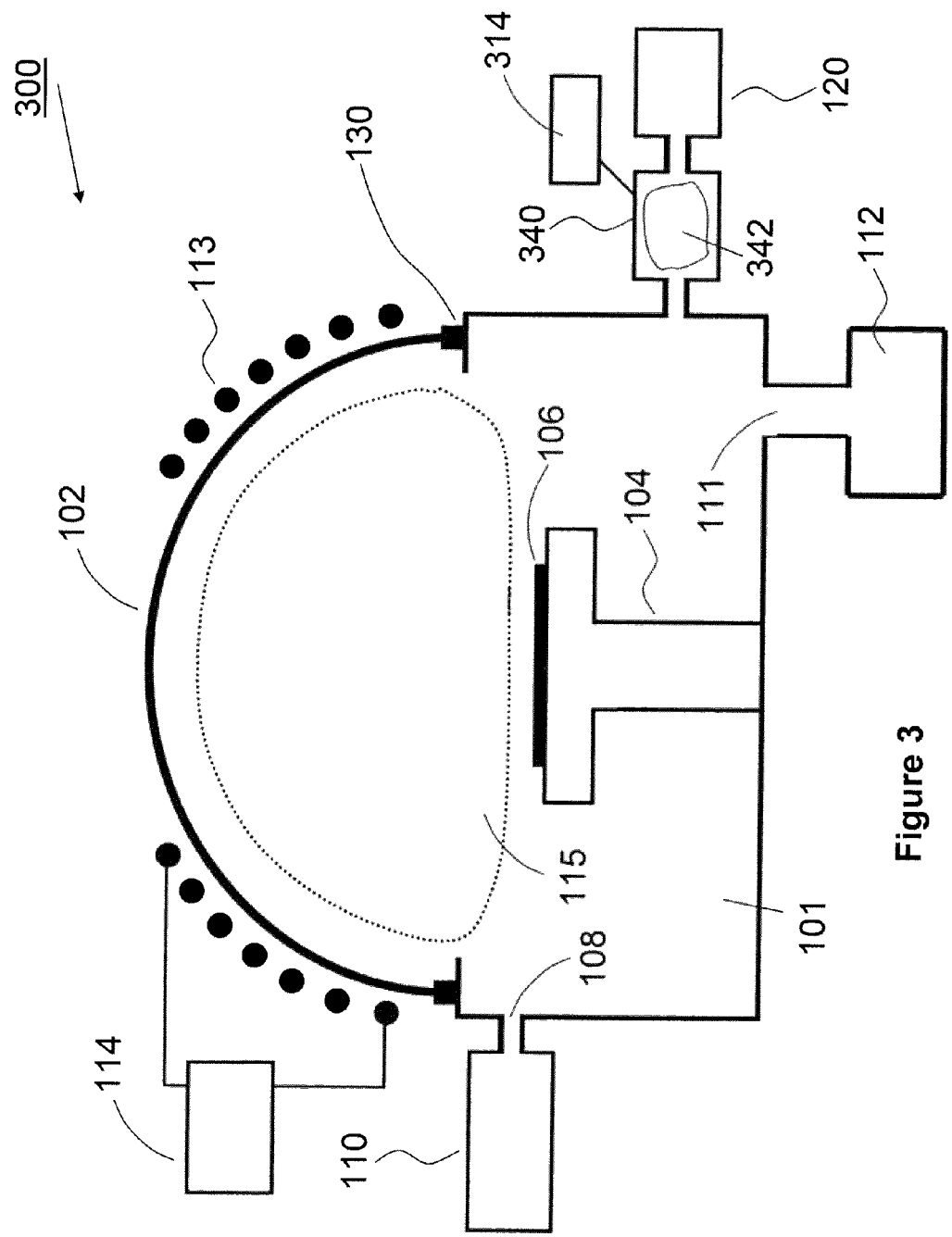
FIG. 3 is a simplified schematic view of a processing system using an embodiment of the present invention, where the leak detection takes place in the self-contained plasma generated in a remote plasma sensor.

Another embodiment of the present invention is shown in FIG. 3. FIG. 3 shows an apparatus 300 for processing wafer 106. Many components of the apparatus 300 are similar to the components of the apparatus 100 shown in FIG. 1. In case of apparatus 300, instead of the spectrometer 120 measuring the signature of a gas from the main plasma 115 inside the chamber 101, it is used to measure the signature of the gas from a remote plasma sensor 340, where this remote plasma sensor 340 has a self-contained plasma 342. The main plasma 115 may or may not be present (that is why the plasma 115 is shown in dotted lines), depending on the mode of operation, as described below. Remote plasma sensor 340 is coupled to the chamber 101, so that gas can flow into it from the chamber 101. Remote plasma sensor 340 may has its own gas supply too (not shown in FIG. 3). Remote plasma sensor 340 has its own RF power supply 314, and may have RF coils (not shown). Persons skilled in the art will understand that the embodiment in FIG. 3 is going to be most advantageous when a spectrometer 120 is used as the chemical component analysis device, as enhancement of the intensity of the emission spectra in the remote plasma sensor 340 is beneficial for spectrometric detection. Other types of chemical component analysis devices, such as a residual gas analyzer, or an infrared absorption meter, that do not depend on emission spectra, may not be able to extract additional advantage from the presence of the remote plasma sensor 340.

In one mode of operation, a remote plasma sensor 340 can be used when the processing chamber 101 does not contain a plasma 115. In another mode of operation, remote plasma sensor 340 can also be used when there is plasma 115 in the processing chamber 101, but greater sensitivity is needed for argon detection. Since the properties of the main plasma 115 in the chamber 101 are dictated by what is optimum for the processing of the wafer 106, the emission might or might not be optimum for detection of argon; whereas, in the case of the remote plasma sensor 340, the self-contained plasma 342 can be optimized exclusively for the best detection of the argon.

Since oxygen and hydrogen have their own characteristic wavelengths at which their peaks show up in a spectrum, simultaneous with the measurement of the argon, one can also detect and measure the presence of these two constituents, and as such, make a measurement of the amount of outgassing inside the chamber 101. These measurement can be done using the embodiment of either FIG. 1 or FIG. 3.

Figures 4A, 4B:
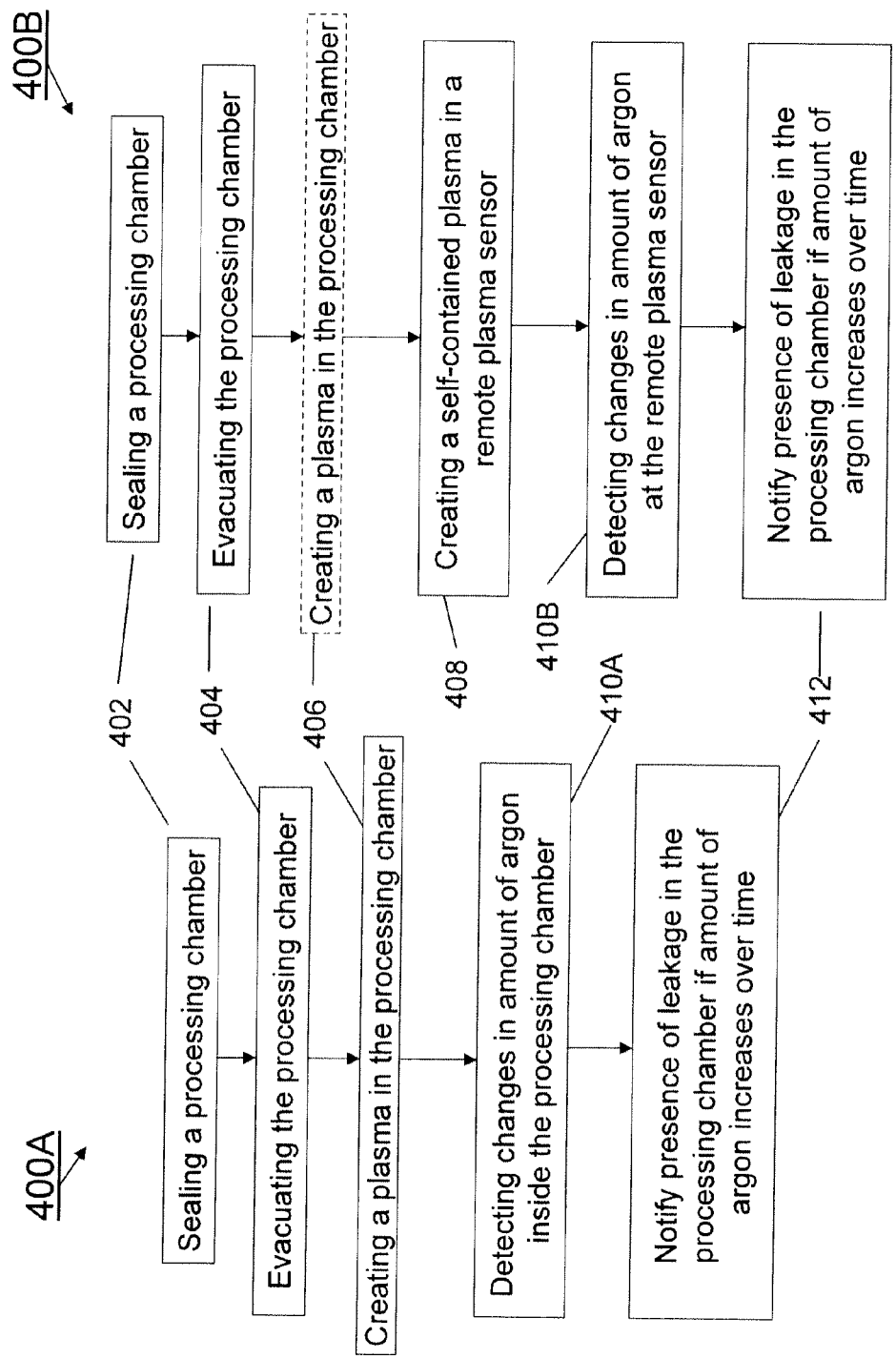
FIG. 4A is a flowchart showing example leak detection process flow in the apparatus shown in FIG. 1.
FIG. 4B is a flowchart showing example leak detection process flow in the apparatus shown in FIG. 3.

FIGS. 4A and 4B illustrate example process flows for leak detection using, for example, apparatus 100 and apparatus 300 respectively. Flowcharts 400A in FIG. 4A and flowchart 400B in FIG. 4B show illustrative steps only, and are not limiting. All of the steps in the flowcharts do not have to be performed, and intermediate steps not shown specifically may be added, depending on the system configuration. Processes shown in FIGS. 4A-4B are not restricted to the apparatuses 100 and 300. Orders of the steps in the flowcharts are also not restrictive to the scope of the invention.

In step 402, a processing chamber is sealed. In step 404, the processing chamber is evacuated.

In step 406, a plasma is created in the processing chamber. This step is essential in case of the process shown in flowchart 400A, as level of argon is detected from the plasma created in the processing chamber, as described in step 410A. However, this step is optional in case of the process shown in flowchart 400B, as level of argon is detected elsewhere, as described in step 410B. In case of the process shown in flowchart 400B, the intermediate step 408 is performed, where a self-contained plasma is created in a remote plasma sensor. In step 410B, changes in amount of argon is detected from the plasma created inside the remote plasma sensor.

In step 412, the presence of leakage in the processing chamber (i.e., the main processing chamber, not the remote plasma sensor) is notified, if the amount of argon increases over time.

In addition, although not shown specifically in the flowcharts, additional measurement can be performed, such as measuring the amount of oxygen, and/or the presence of moisture to help in detecting and quantifying outgassing from the processing chamber.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the server arts. It is intended that the specification and examples be considered as exemplary only, with a true scope and spirit of the invention being indicated by the following claims.

What is claimed is:

1. A method of determining the presence of an atmospheric leak in a process chamber, comprising:
   sealing the chamber;
   injecting gas consisting essentially of nitrogen into the chamber;
   igniting plasma in the chamber using the nitrogen;
   detecting changes in the amount of argon inside the chamber;
   declaring a presence of a leak when the amount of argon increases over time.

2. The method of claim 1 wherein detecting changes is carried out with optical emission spectroscopy.

3. The method of claim 1 wherein detecting changes is carried out with infrared adsorption.

4. The method of claim 1 wherein detecting changes is carried out with residual gas analysis.

5. A method of determining the presence of an atmospheric leak in a process chamber, comprising:

sealing the chamber;
detecting changes in the amount of argon inside the chamber;
declaring a presence of a leak when the amount of argon increases over time; and,
wherein detecting changes is performed on plasma located in a remote, self-contained region relative to the chamber and sustained by gas consisting essentially of nitrogen.

6. The method of claim 5 further comprising concurrently detecting outgassing within the chamber by detecting the presence of oxygen in the chamber.

7. The method of claim 6, wherein detecting oxygen is used to calculate the amount of outgassing from the chamber walls.

8. The method of claim 5 further comprising concurrently detecting outgassing within the chamber by detecting the presence of moisture in the chamber.

9. The method of claim 8, wherein detecting moisture is used to calculate the amount of outgassing from the chamber walls.

10. The method of claim 5, wherein detecting changes is carried out with optical emission spectroscopy.

11. A method of determining the presence of an atmospheric leak in a process chamber, comprising:
sealing the chamber;
evacuating the chamber to a prescribed vacuum level;
injecting gas consisting essentially on nitrogen into the chamber;
igniting plasma in the chamber using the nitrogen;
detecting changes in the amount of argon inside the chamber; and,
declaring a presence of a leak when the amount of argon increases over time.

12. The method of claim 11 where the measurement is carried out with optical emission spectroscopy.

13. The method of claim 11 where the measurement is carried out with infrared adsorption.

14. The method of claim 11 where the measurement is carried out with residual gas analysis.

15. A method of determining the presence of an atmospheric leak in a process chamber, comprising:
sealing the chamber;
evacuating the chamber to a prescribed vacuum level;
detecting changes in the amount of argon inside the chamber using emission; and,
wherein the emission is created by a remote, self-contained plasma sustained by gas consisting essentially of nitrogen; and,
declaring a presence of a leak when the amount of argon increases over time.

16. The method of claim 15 further comprising concurrently detecting outgassing within the chamber by measuring amount of oxygen in the chamber.

17. The method of claim 16, where the measurement of oxygen is used to calculate the amount of outgassing from the chamber walls.

18. The method of claim 15 further comprising concurrently detecting outgassing within the chamber by measuring for the presence of moisture in the chamber.

19. The method of claim 18, where the measurement of moisture is used to calculate the amount of outgassing from the chamber walls.

20. The method of claim 15, where the measurement is carried out with residual gas analysis.

* * * * *